(12) United States Patent
Sebastian

(10) Patent No.: US 8,776,016 B2
(45) Date of Patent: Jul. 8, 2014

(54) INTEGRATION OF STRUCTURED PROFILING DATA WITH SOURCE DATA IN THE ECLIPSE DEVELOPMENT ENVIRONMENT

(75) Inventor: Kent K. Sebastian, Hamilton (CA)

(73) Assignee: Red Hat, Inc., Raleigh, NC (US)

( * ) Notice: Subject to any disclaimer, the term of this patent is extended or adjusted under 35 U.S.C. 154(b) by 667 days.

(21) Appl. No.: 12/608,937

(22) Filed: Oct. 29, 2009

(65) Prior Publication Data

US 2011/0107298 A1    May 5, 2011

(51) Int. Cl.
*G06F 9/44* (2006.01)

(52) U.S. Cl.
USPC ............................. 717/113; 717/125

(58) Field of Classification Search
None
See application file for complete search history.

(56) References Cited

U.S. PATENT DOCUMENTS

| | | | |
|---|---|---|---|
| 5,857,097 A * | 1/1999 | Henzinger et al. | 712/236 |
| 6,972,761 B1 | 12/2005 | Cox et al. | |
| 7,539,604 B1 | 5/2009 | Stothert et al. | |
| 7,714,864 B2 | 5/2010 | Cahill et al. | |
| 2002/0116702 A1 * | 8/2002 | Aptus et al. | 717/170 |
| 2002/0170048 A1 * | 11/2002 | Zgarba et al. | 717/168 |
| 2003/0038831 A1 | 2/2003 | Engelfriet | |
| 2003/0188187 A1 * | 10/2003 | Uchida | 713/200 |
| 2004/0003119 A1 * | 1/2004 | Munir et al. | 709/246 |
| 2005/0034106 A1 | 2/2005 | Kornerup et al. | |
| 2006/0200799 A1 | 9/2006 | Wills et al. | |
| 2010/0017788 A1 | 1/2010 | Bronkhorst et al. | |
| 2010/0138811 A1 * | 6/2010 | Jayaraman et al. | 717/125 |
| 2010/0306736 A1 | 12/2010 | Bordelon et al. | |
| 2010/0313188 A1 * | 12/2010 | Asipov et al. | 717/139 |
| 2011/0107298 A1 * | 5/2011 | Sebastian | 717/113 |
| 2011/0107305 A1 | 5/2011 | Baron | |
| 2011/0107313 A1 | 5/2011 | Baron | |
| 2012/0036370 A1 | 2/2012 | Lim et al. | |

OTHER PUBLICATIONS

Non-Final Office Action mailed Oct. 11, 2012 for U.S. Appl. No. 12/612,545.
Final Office Action mailed Oct. 12, 2012 for U.S. Appl. No. 12/612,560.
Final Office Action mailed Feb. 6, 2013 for U.S. Appl. No. 12/612,560.
Kapo C++: Detecting Memory Leak, http://kapo-cpp.blogspot.com/2007/02/detecting-memory-leak.html, Feb. 25, 2007, 9 pages.
Wingolog, Catching Memory leaks with Valgrind's Massif, http://Wingolog.org/archives/2008/05/05 catching-memory-leaks-with-valgrinds-massif, May 5, 2008, 5 pages.

* cited by examiner

*Primary Examiner* — Elias Mamo
(74) *Attorney, Agent, or Firm* — Lowenstein Sandler LLP

(57) ABSTRACT

A computer-implemented system and method including receiving an output file from a profiling utility by an integrated development environment component. The output file is used to generate an interactive presentation of data by a computer system to visually organize profiling data automatically. Corresponding source code is displayed in response to a user selection of a data point of the interactive presentation within the integrated development environment.

18 Claims, 4 Drawing Sheets

INTEGRATION OF STRUCTURED PROFILING DATA WITH SOURCE DATA IN THE ECLIPSE DEVELOPMENT ENVIRONMENT

TECHNICAL FIELD

The embodiments of the invention relate to a integrated development environment. Specifically, the embodiments of the invention relate to an integrated development environment with an integrated presentation and source code interface.

BACKGROUND

An integrated development environment (IDE) provides a set of tools such as editing and debugging software for programmers. These tools are utilized to create and to debug new software programs. The IDE supports software development by providing a windowed system for source file editing, project management, file interdependency management and debugging. ECLIPSE®, the Eclipse Foundation, is an IDE for C and C++ development on the LINUX® platform. ECLIPSE® uses a plug-in based software model where all the components of the IDE are structured as plug-ins for the IDE.

There are many other types of programming tools that are not part of an IDE and are used on a stand-alone basis. One example of a stand alone tool is Valgrind. Valgrind is profiling utility that provides a suite of tools including a memcheck tool, an address check tool, a heap profiler tool and a cache profiler tool. Another example of a stand-alone programming tool is Oprofile. Oprofile is a profiling utility for the LINUX® platform that configures a processor to generate data useful for debugging. Oprofile can collect data from the configured processor to provide a cache miss counter, a cache stall counter, a memory fetch counter and similar functionality dependent on architecture and functionality of the processor being profiled. Valgrind and Oprofile are typically command line tools that generate simple flat output files.

BRIEF DESCRIPTION OF THE DRAWINGS

Embodiments of the invention are illustrated by way of example and not by way of limitation and the figures of the accompanying drawings in which like references indicate similar elements. It should be noted that different references to "an" or "one" embodiment in this disclosure are not necessarily to the same embodiment, and such references mean at least "one."

DETAILED DESCRIPTION

Figure 1:
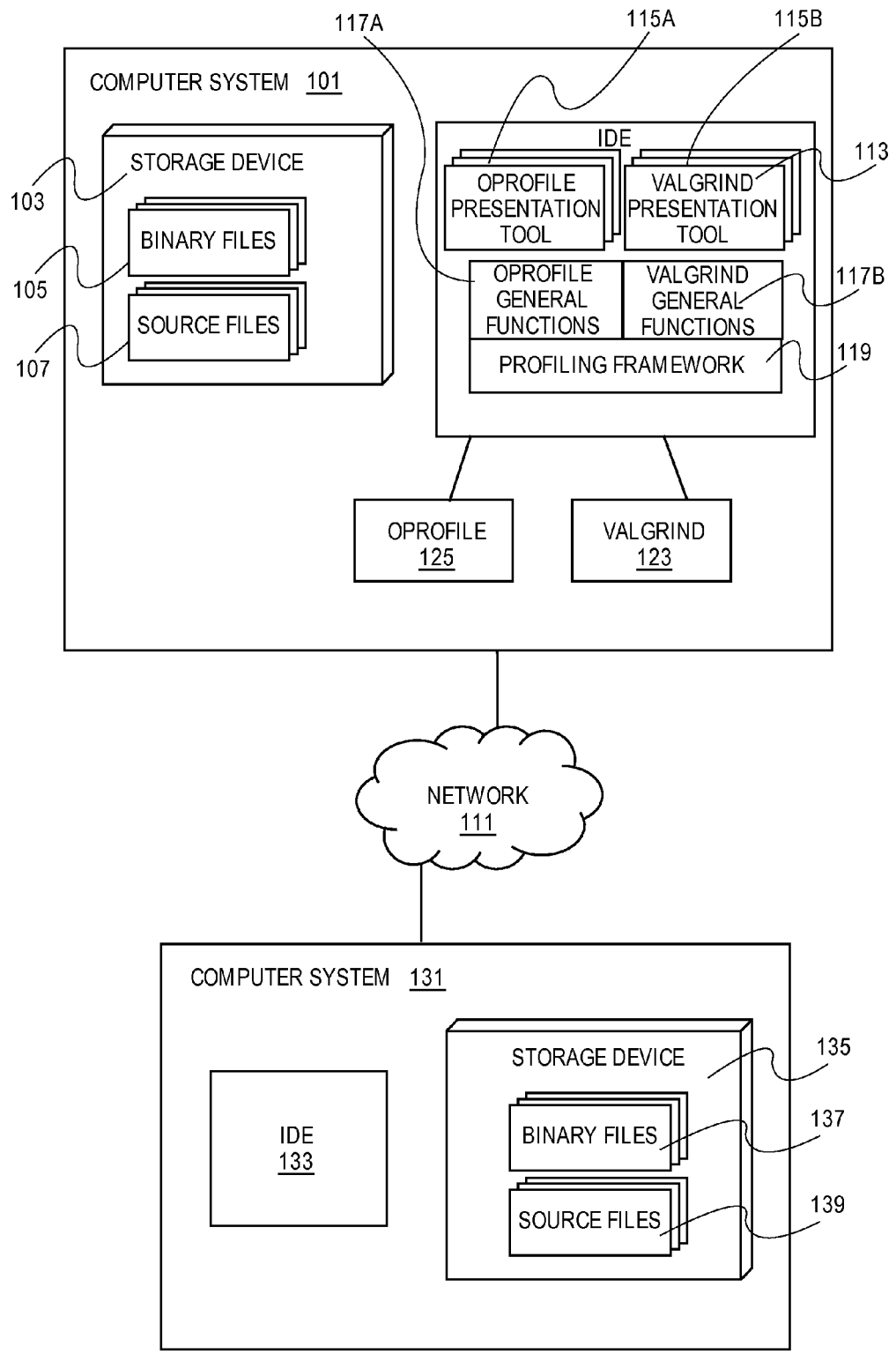
FIG. 1 is a diagram of one embodiment of an integrated structured profile data and source code presentation tool.

FIG. 1 is a diagram of one embodiment of an integrated structured profile data and source code presentation tool. In one embodiment, a computer system 101 implements the presentation tool and includes a storage device 103, an integrated development environment (IDE) 113 and a set of stand-alone tools 123, 125. In another embodiment, the IDE and the integrated source code and profiling data presentation tool are a part of a distributed system. In the distributed system embodiment, the computer system 101 communicates over a network 111 with a remote computer system 131. The distributed system can include any number of additional computer systems 131. For sake of clarity, a distributed embodiment with the single additional computer system 131 is described. One skilled in the art would understand that any number of additional computer systems could be included in a distributed system that incorporate similar features, functions and structures.

The computer system 101 can be any type of computing device including a desktop computer, a workstation, a dedicated server, a handheld device or a similar computing device. The network 111 can be a local area network (LAN), a wide are network (WAN), such as the Internet, or a similar communication system. The network 111 can include any number of intermediate computing devices and network elements between the communicating computer systems 101, 131. The network 111 can include any number or combination of wired and wireless communication mediums between the nodes in the network. Other computer systems 131 can also be any type of computing device including a desktop computer, a workstation, a dedicated server, a handheld computer system or similar computing device.

The computer system 101 can include any type and number of storage devices 103. The storage devices 103 can be fixed disk drives, removeable storage medium drives that are external or internal drives, random access memory (RAM), static memory or similar storage devices. The storage devices 103 can be used to store a set of binary files 105 and source files 107, as well as, installed programs and tools including the IDE 113 and stand alone tools 123, 125. The binary files 105 and source files 107 are data files that are part of a programming project managed by the IDE 113. The binary files 105 are compiled code generated from the source files 107. The source files 107 are sets of program instructions in a high level computer language like C or C++. A 'set,' as used herein refers to any positive whole number of items including one item.

The IDE 113 is an application for assisting a user in managing a software programming project. The IDE 113 assists in the management of source files 107 and binary files 105, program compiling, source file editing and similar tasks associated with software development. In one embodiment, the IDE 113 is the ECLIPSE® IDE. The IDE 113 can have a set of integrated tools or plug-ins 115A, 115B. These tools 115A, 115B assist the user in debugging, editing, compiling or similarly managing the project. In one example embodiment, the tools 115A, 115B are plug-ins that operate in conjunction with a set of utility specific general purpose or intermediate plug-ins or functions 117A or 117B and a general purpose framework plug-in or component 119.

For example, the framework plug-in or component 119 can be a profiling framework for providing a set of functions relating to program execution profiling. The profiling framework can support interfacing with external utilities such as an Oprofile utility 125, a Valgrind utility 123 or similar programs. The framework plug-in or component 119 defines a set of functions that provide access to data structures and resources of the IDE to plug-ins of the IDE. A set of utility specific general purpose functions 117A, 117B for interfacing with each external program can also be defined. For example, an Oprofile specific set of functions can be provided through a plug-in 117A and a Valgrind specific set of functions can be provided through a plug-in 117B. Sets of tools 115A, 115B can then be provided that are specific to each of the external utilities and allow the user to interface with the functionality of those external utilities within the integrated development environment. This set of utility specific general purpose functions 117A, 117B define functions for calling the corresponding external profiling utilities and passing parameters such as a selected binary to the profiling utility. The functions return the output of the profiling utility to be further processed by the tools 115A, 115B. These calling functions utilize the command line interfaces of the profiling utility and make them accessible to the tools 115A, 115B.

The tools 115A, 115B can include an integrated source code and profiling data presentation tool that provides a structured representation of the output of these external utilities. The tools 115A, 115B receive a selection of a binary that a user wants to process and utilize the profiling framework 119 component and specific general purpose functions 117A, 117B to call a profiling utility. The profiling framework 119 and specific general purpose functions 117A, 117B return the output of the profiling utility. The tools 115A, 115B can then process this output data to identify the hierarchy of the data and generate a data model such as a tree model. The specific examples of the Oprofile 125 and Valgrind 123 external utilities, the profiling framework 119, the Oprofile general functions 117A, the Valgrind general functions 117B and the Oprofile and Valgrind specific presentation tools 115A and 115B are provided by way of example. One skilled in the art would understand that the structures, functions, and principles described in regard to these specific examples are applicable to any external tool that can be integrated and provided through a visual interface within the IDE 113, through a similar software structure, set of general function and tools. In further embodiments, the framework 119, general functions 117A, 117B and tools 115A, 115B can be integrated into a monolithic plug-in or directly integrated into the IDE. Other permutations of these configurations are also within the scope of the invention.

The external tools 123, 125 are stand alone utilities. These external utilities 123, 125 are command line programs for use on the LINUX® platform. The plug-ins of the IDE 113 enable the interfacing of the IDE 113 with these external utilities 123, 125 and the utilization of the output of these utilities within the IDE 113 environment. The profile framework 119 in combination with the general functions 117A, 117B, and tools 115A, 115B enable interfacing with the functionality of these external utilities in the IDE 113 environment as an integrated visual experience. Further, the tools 115A, 115B enable an integration with the source code 107 and the output of the external utilities. For example, the output of the utilities can be displayed as a hierarchical tree or similar user interface mechanism. The tools 115A, 115B further provide the functionality that the hierarchical tree or user interface mechanism can be interactive such that a data point in the tree can be correlated with a line or set of lines in the source code 107, which then can be displayed to a user upon selection of the data point in the displayed chart. The functionality of the tools 115A, 115 can be specific to the corresponding profiling utility.

In a distributed computing environment, a remote computer system 131 can be used to provide access to additional binary files 137 or source files 139 on the storage device 135 within the computer system 131. One of ordinary skill in the art would understand that any combination of resources can be provided over a network 111 by a computer system 131 to a user of an IDE 113 on the computer system 101. Similarly, the user of a computer system 131 and IDE 133 on that computer system 131 can interact with and utilize resources from the computer system 101 over the network 111. In this manner, the distributed computing environment enables the use of resources across the network 111 that allow a user of an IDE 113, 133 to access a larger range of resources that are present on each of the distributed computer systems 101, 131.

Figure 2:
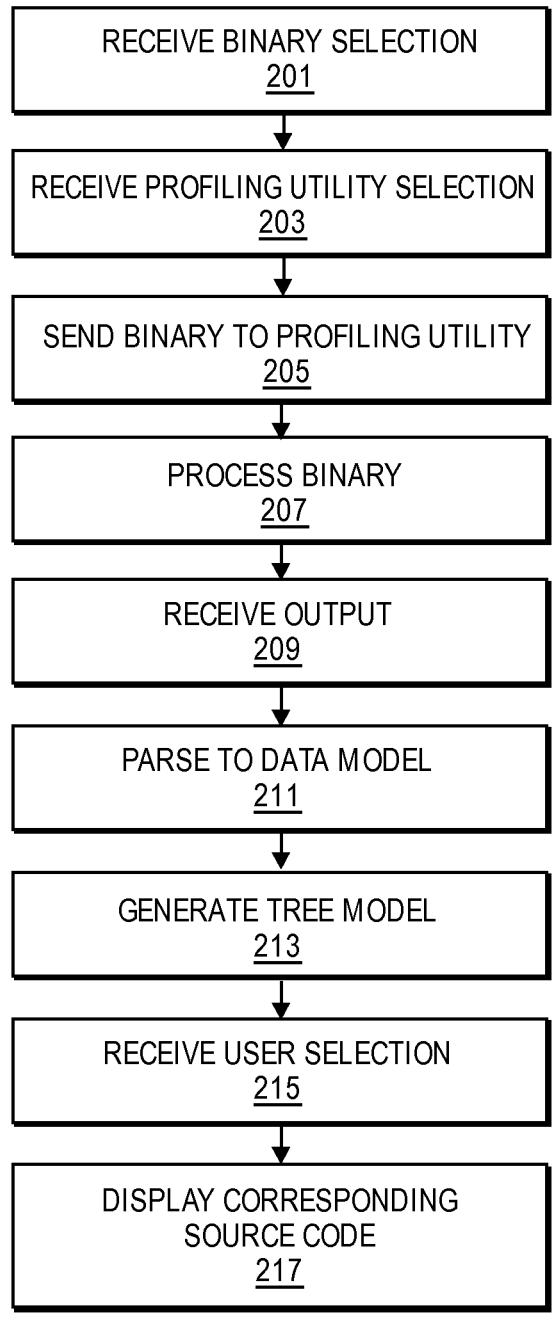
FIG. 2 is a diagram of one embodiment of a flowchart for generating an integrated structured profile data and source code presentation tool.

FIG. 2 is a diagram of one embodiment of a flowchart for generating an integrated structured profile data and source code presentation tool. The process may be initiated by a user selecting a binary file to be processed (Block 201). The selection is made through the menu system or similar user interface mechanism of the integrated development environment. The integrated development environment can utilize any user interface system to provide access to the binary files and similar aspects of the project. The user then inputs the profiling utility selection (Block 203). The user can select any profiling utility to utilize in connection with the selected binary. In one example embodiment, the selected profiling utility is the Oprofile tool. The profiling utility can be selected through the use of selection of a corresponding presentation tool or similar tool in the integrated development environment. The tool then sends the binary to the profiling utility to be processed (Block 205). The presentation tool or similar tool interacts with the profiling utility through the general functions for the profiling utility as well as the profiling framework, which together provide a set of functions or methods to interface the integrated development environment with the selected profiling utility to provide the selected binary or indicator of the selected binary to the profiling utility. In one embodiment, the presentation tool calls a function of a set of utility specific general purpose functions specifying the selected binary as a parameter. The function then initiates the profiling utility through its command line interface and passes the binary as a parameter to the profiling utility.

The profiling utility processes the selected binary as though it was operating as a stand-alone program (Block 207). The profiling utility generates a standard output file or stream based on the input binary and returns it to the calling function of the set of utility specific general purpose functions. The function then returns the output to the calling program, which in this case is the presentation tool plug-in in the integrated development environment. The presentation tool and the underlying set of utility specific general purpose functions receive the output from the profiling utility (Block 209). The output is the standard output of the profiling utility in the form of a stream, file or similar output format. The output is converted and parsed into a data model for use in the integrated development model or the presentation tool (Block 211). In one embodiment the data may be converted directly into a structured or hierarchical model (e.g., a tree model) or in another embodiment this conversion to a structured or hierarchical model may be a separate step (Block 213). In one embodiment, the data returned by the profiling utility is parsed to be grouped hierarchically for each run of a binary by the profiling utility with each component, function and line of the binary tracked according to the metric of the profiling utility. Thus, each of the data points returned by the profiling utility are organized in to the hierarchical structure such that a run, component, function and line are levels of the hierarchy. This hierarchy can define the leaf and node structure of a tree to form a tree model.

The generated structured model is then displayed through the user interface of the integrated development environment by the presentation tool. This interactive user interface can be displayed through a standard window menu. Any standard set of user interface mechanisms can be used to navigate, expand or collapse the structure to facilitate the user interacting with the structured data to view the desired data. The user can select the particular line, function or component of a program within the structured data (Block 215), then the corresponding source code is automatically identified and retrieved to be displayed in an editor or viewing panel of the integrated development environment (Block 219). This enables the user to identify the source code that is responsible for a profiled metric and edit it as necessary by selecting and navigating a particular data point in the profiling data. The structured data can be a tree model or similar data structure.

Figure 3:
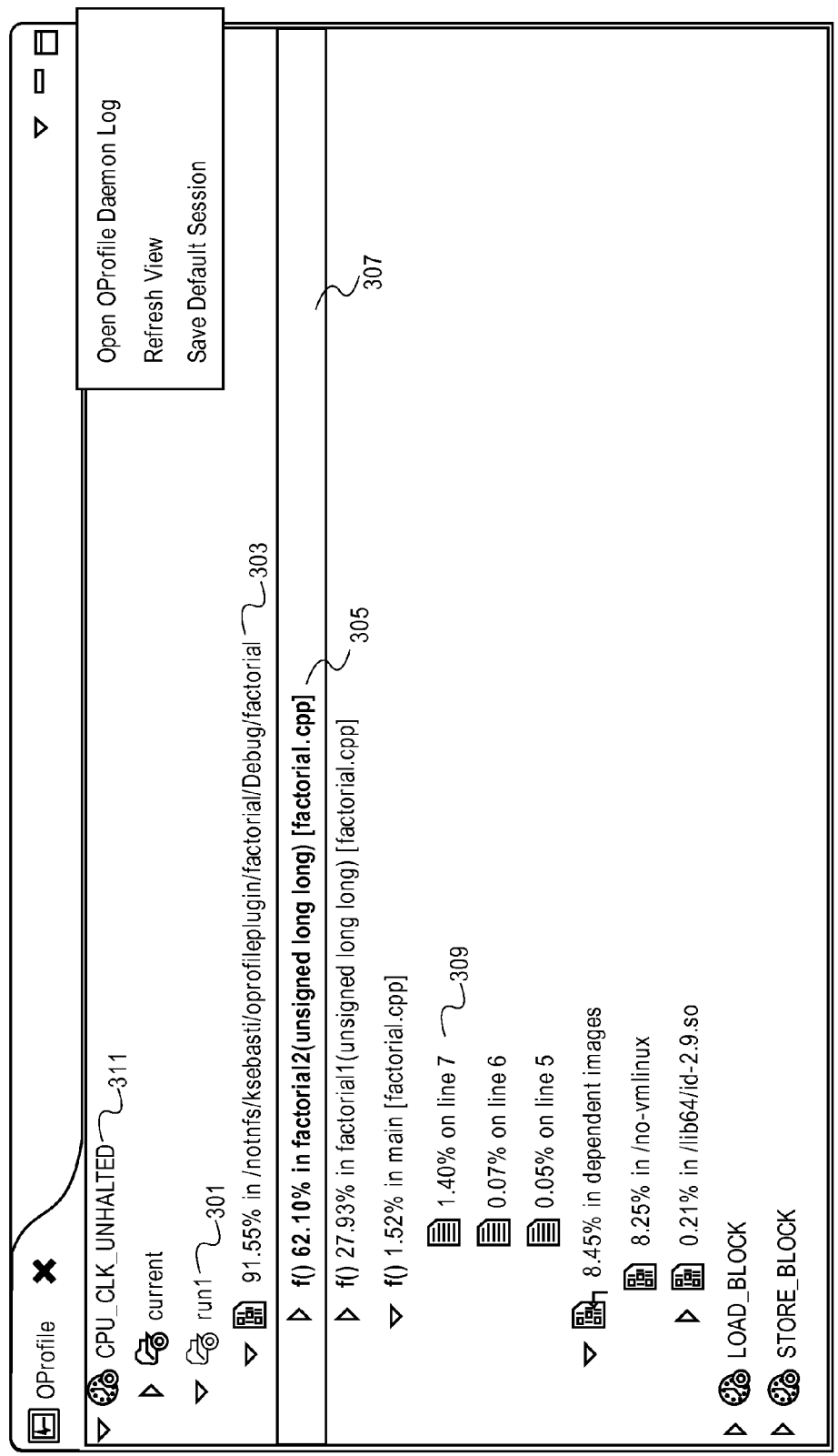
FIG. 3 is a diagram of one embodiment of a user interface for the integrated structured profile data and source code presentation tool.

FIG. 3 is a diagram of one embodiment of a user interface for the integrated structured profile data and source code presentation tool. In one example embodiment, the structured profile data is in the form of a tree model and is displayed through a window based user interface. The tree model is a hierarchical structure where multiple profiling utility output files can be made available and specific runs of the profiling utility are available. The user can interact with the model at any level. For example, the user can select a CPU clock monitor 311 as a type of profile and associated data to review. The user can then select the specific run 301 that the user wishes to review within the set of CPU clock monitor data. The profiling data is broken down by the source file 303, functions 305 and code lines 309. The user can then select any line or level in the tree structure 307 to initiate the display of the corresponding facet of the program that was profiled. For example, the user can select a specific function to display causing the corresponding function to be displayed in a viewing or profiling plane of the integrated development environment.

Figure 4:
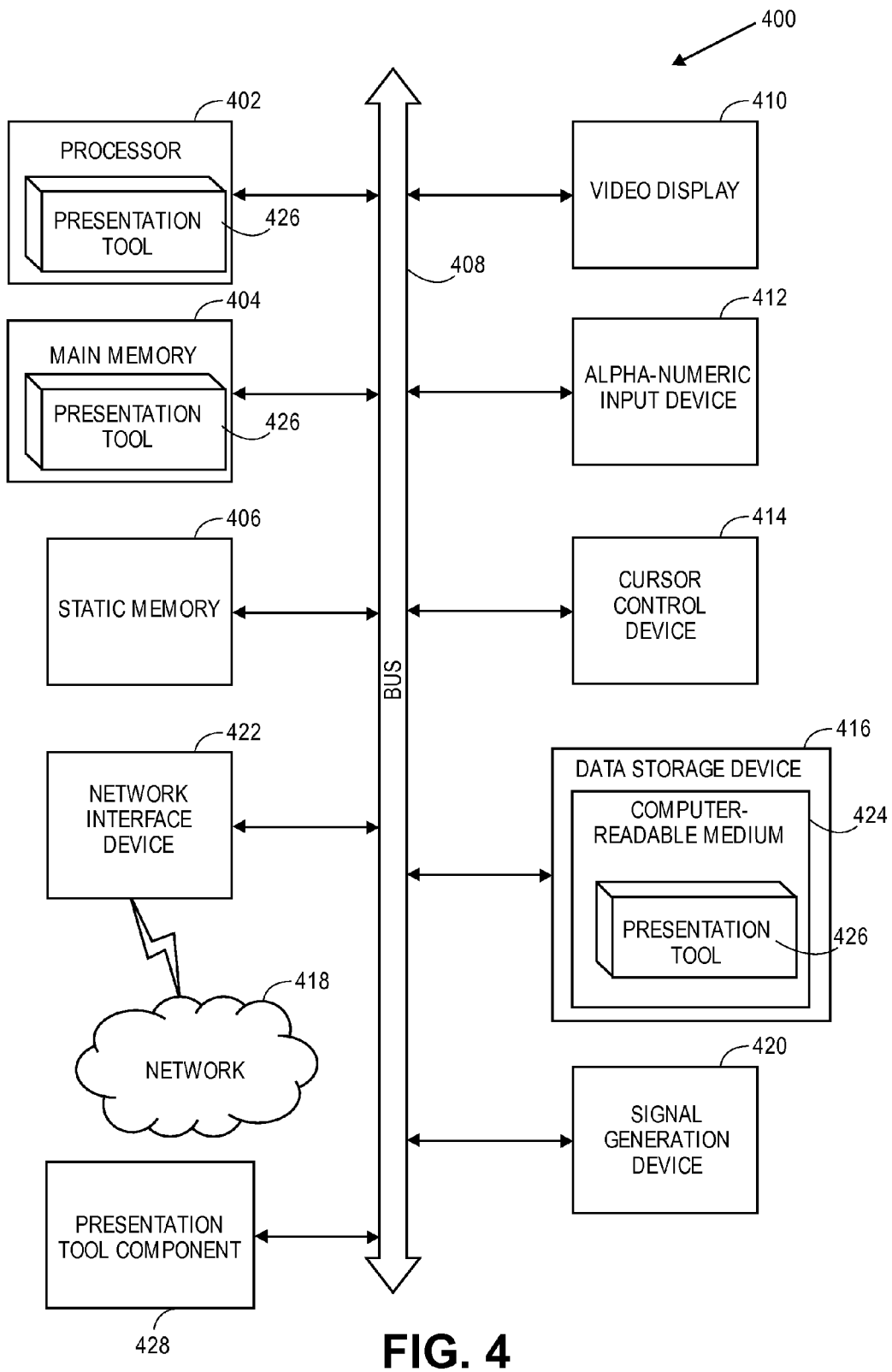
FIG. 4 is a diagram of one embodiment of a computer system implementing the integrated structured profile data and source code presentation tool.

FIG. 4 is a diagram of one embodiment of a computer system implementing the integrated structured profile data and source code presentation tool. Within the computer system 400 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine (e.g., a client computer executing the desktop management program and the server computer executing the remote application) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a secondary memory 416 (e.g., a data storage device in the form of a drive unit, which may include fixed or removable computer-readable medium), which communicate with each other via a bus 408.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the presentation tool 426 for performing the operations and steps discussed herein.

The computer system 400 may further include a network interface device 422. The computer system 400 also may include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions (e.g., the presentation tool 426) embodying any one or more of the methodologies or functions described herein. The presentation tool 426 may also reside, completely or at least partially, within the main memory 404 and/or within the processing device 402 during execution thereof by the computer system 400, the main memory 404 and the processing device 402 also constituting machine-readable storage media. The presentation tool 426 may further be transmitted or received over a network 418 via the network interface device 422.

The machine-readable storage medium 424 may also be used to store the presentation tool 426 persistently. While the machine-readable storage medium 424 is shown in an exemplary embodiment to be a single medium, the term "machine-readable storage medium" and also "computer-readable medium" should be taken to include a single medium or multiple media (e.g., a centralized or distributed database, and/or associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" and "computer-readable medium" shall accordingly be taken to include, but not be limited to, solid-state memories, and optical and magnetic media.

The presentation tool 426 can also be a discrete component 428 that performs the functions described herein. The presentation tool component 428 can be any type of special purpose or programmed device in communication with the computer system over the bus or through a network connection.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating," "assigning," "populating," "displaying," "retrieving," "switching," "moving," "marking," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Thus, a method and apparatus for desktop management has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
    transmitting by a computer system, via an integrated development environment (IDE) executed by the computer system, a binary file to a profiling utility external to the IDE;
    receiving by the computer system, within the IDE an output file that is generated by the profiling utility processing the binary file;
    organizing by the computer system, the output file into a set of events, wherein each of the set of events is associated with a respective portion of source code of a program and a respective profiling metric value;
    generating by the computer system, within the IDE, an interactive graphical component that presents a plurality of profiling data points from the output file, the profiling data points corresponding to performance data generated by the profiling utility in view of the execution of the program;
    receiving by the computer system, within the IDE, a user selection of one of the plurality of profiling data points; and
    displaying by the computer system, within the IDE, the source code of the program that corresponds to the selected profiling data point.

2. The method of claim 1, further comprising:
    receiving by the computer system, from a user, an identification of the binary file and an identification of the profiling utility; and
    sending the binary file to the profiling utility.

3. The method of claim 1, wherein the output file is received via a plug-in of the IDE.

4. The method of claim 1, wherein the profiling utility is Oprofile™.

5. The method of claim 1, wherein the integrated development environment is Eclipse™.

6. The method of claim 1, wherein the plurality of profiling data points are presented hierarchically by the interactive graphical component.

7. The method of claim 1, wherein each line of code of the respective portion of source code has a respective profiling metric value.

8. A non-transitory computer-readable storage medium having a set of instructions stored therein, which when executed, cause a computer system to perform a set of operations, comprising:
    transmitting by the computer system, via an integrated development environment (IDE) executed by the computer system, a binary file to a profiling utility external to the IDE;
    receiving by the computer system, within the IDE an output file that is generated by the profiling utility processing the binary file;
    organizing by the computer system, the output file into a set of events, wherein each of the set of events is associated with a respective portion of source code of a program and a respective profiling metric value;
    generating by the computer system, within the IDE, an interactive graphical component that presents a plurality of profiling data points from the output file, the profiling data points corresponding to performance data generated by the profiling utility in view of the execution of the program;
    receiving by the computer system, within the IDE, a user selection of one of the plurality of profiling data points; and displaying by the computer system, within the IDE, the source code of the program that corresponds to the selected profiling data point.

9. The non-transitory computer-readable storage medium of claim 8, wherein the set of operations further comprises:
receiving by the computer system, from a user, an identification of the binary file and an identification of the profiling utility; and
sending the binary file to the profiling utility.

10. The non-transitory computer-readable storage medium of claim 8, wherein the output file is received via a plug-in of the IDE.

11. The non-transitory computer-readable storage medium of claim 8, wherein the profiling utility is Oprofile™.

12. The non-transitory computer-readable storage medium of claim 8, wherein the integrated development environment is Eclipse™.

13. The non-transitory computer-readable storage medium of claim 8, wherein the plurality of profiling data points are presented hierarchically by the interactive graphical component.

14. The non-transitory computer-readable storage medium of claim 8, wherein each line of code of the respective portion of source code has a respective profiling metric value.

15. A system comprising:
a memory to store source code; and
a processor coupled to the memory to:
execute an integrated development environment (IDE);
transmit, via the IDE, a binary file to a profiling utility external to the IDE;
organize, via the IDE, the output file into a set of events, wherein each of the set of events is associated with a respective portion of source code of a program and a respective profiling metric value;
receive, via the IDE, a profiling metric from the profiling utility processing the binary file, the profiling metric corresponding to performance data generated by the profiling utility in view of executing the program;
generate an interactive visual representation of correlations between the source code and the profiling metric;
receive, within the IDE, a user selection of one of a plurality of profiling data points associated with the profiling metric; and
display, within the IDE, a portion of the source code corresponding to the selected profiling data points.

16. The system of claim 15, wherein the profiling utility is Oprofile™.

17. The system of claim 15, wherein the integrated development environment is Eclipse™.

18. The system of claim 15, wherein the processor further:
generates a tree model by parsing output from the profiling utility to create a hierarchy of events, functions, and lines of code.

* * * * *